Dec. 18, 1951   M. BESSONNEAU   2,578,991
COLLAPSIBLE VEHICLE TOP
Filed June 30, 1947   3 Sheets-Sheet 1
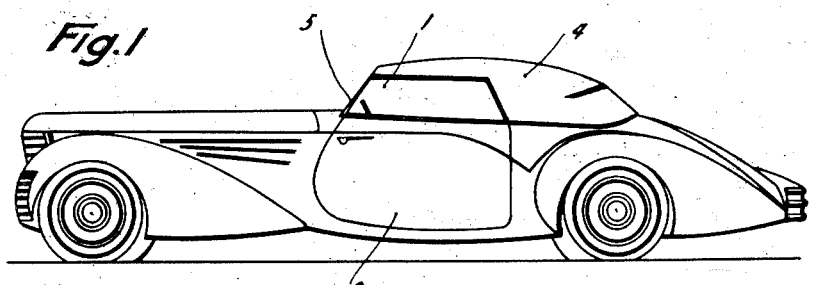
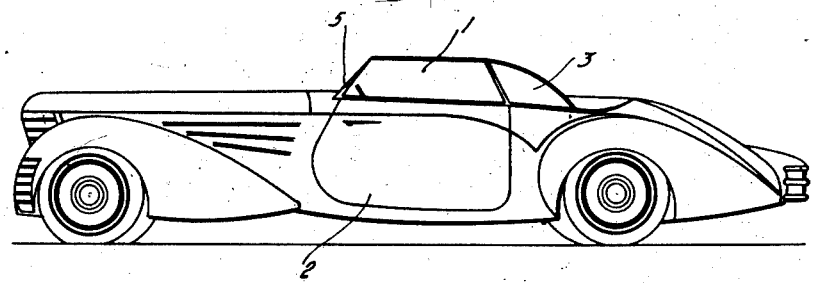
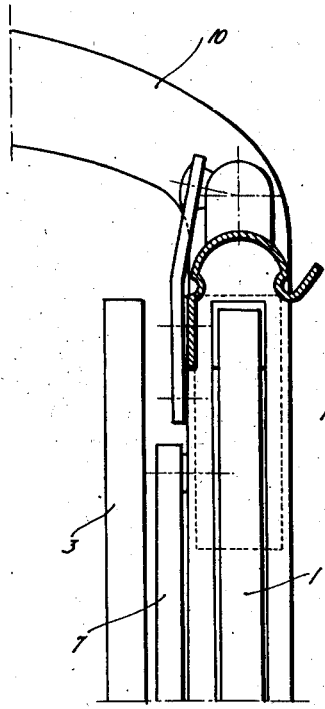
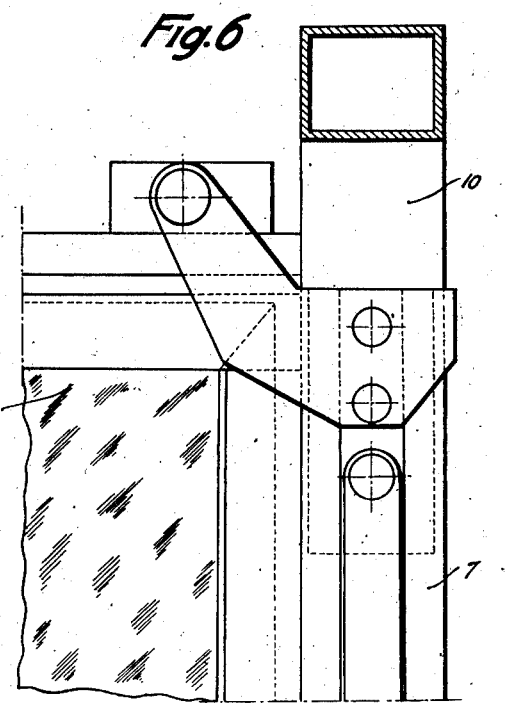

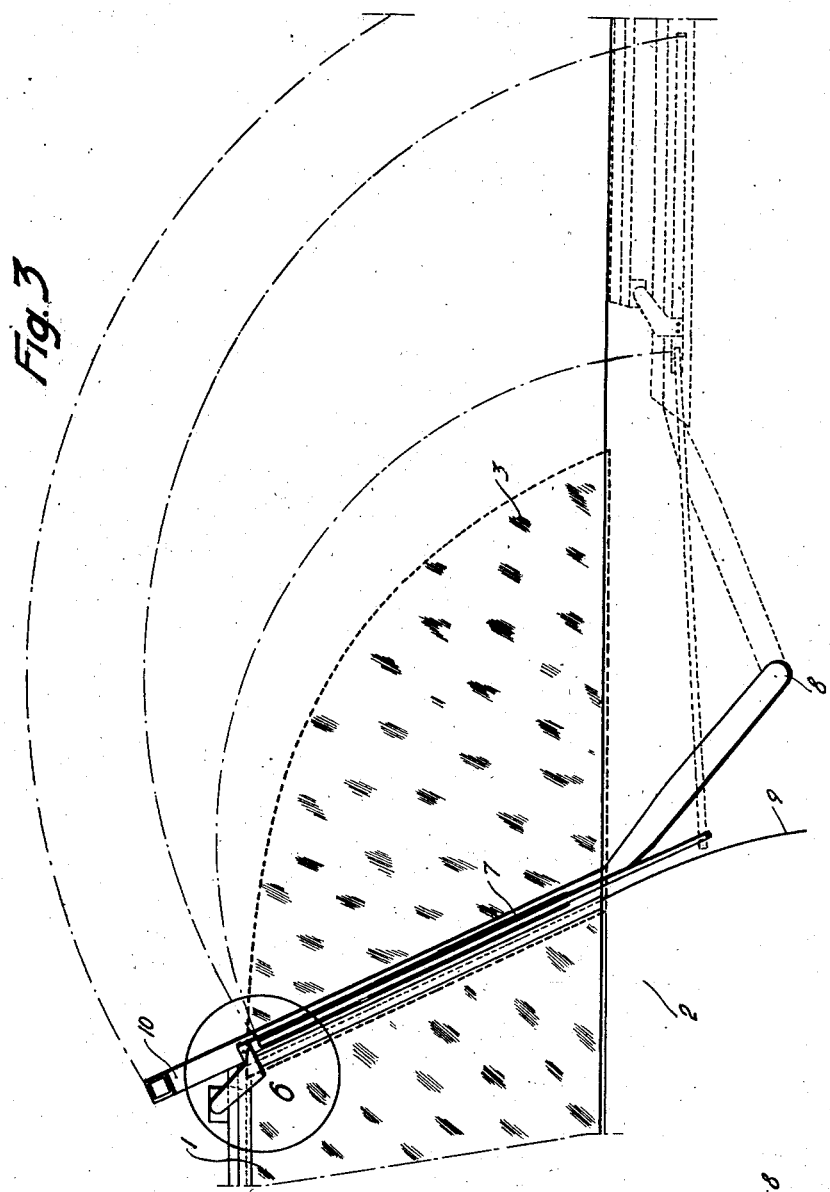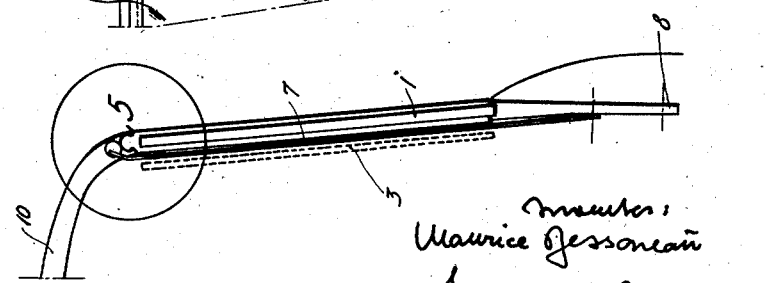

Dec. 18, 1951   M. BESSONNEAU   2,578,991
COLLAPSIBLE VEHICLE TOP
Filed June 30, 1947   3 Sheets-Sheet 3

Patented Dec. 18, 1951

2,578,991

UNITED STATES PATENT OFFICE 2,578,991

COLLAPSIBLE VEHICLE TOP

Maurice Bessonneau, Puteaux, France

Application June 30, 1947, Serial No. 758,056
In France July 13, 1946

2 Claims. (Cl. 296—107)

Two-door, four-seat, four-window cabs of the folding hood type are already known. In such automobiles the rear windows that may be movable or stationary are uncovered and visible from the outside in a permanent manner. Now many customers prefer a four-seat, two-door cab in which the two rear seats are not visible from the outside when the hood is unfolded. Such customers are constrained to buy the cab type including two doors, four seats and only two windows, which type shows the drawback that the two rear seats are almost impossible to use by reason of the wind when the car reaches a speed of 50 miles per hour with the hood folded.

My invention has for its object to satisfy the customers referred to. To this purpose, it has for its subject-matter a cab of the two-door, four-seat, four-window type, wherein the rear windows are shifted laterally with reference to the front windows and the folded hood may conceal the rear windows and fit over the front windows.

In a preferred form of execution, the lateral shifting of the rear windows is performed inwardly whereby said rear windows are not visible from the outside when the hood is unfolded. It is moreover of advantage in particular in the latter case to provide a longitudinal overlap, of a few centimeters for instance, between the front and rear windows.

My invention is not limited as concerns the manner of controlling the hood which may be moved by hand or through a motor. However, the receding hood is preferably of the type described in my U. S. A. Patent No. 2,185,581.

By way of example and by no means in a limiting sense, I have described hereinafter and illustrated in accompanying drawings an embodiment of my improved cab with a folded hood according to my invention. In said drawings:

Fig. 1 is a side view of said cab with the hood closed.

Fig. 2 is a similar view with the hood folded.

Fig. 3 is a diagrammatic side view of the part of the pivoted frame of the hood lying in front of the line separating the front window from the rear window.

Fig. 4 illustrates diagrammatically, looking towards the front of the automobile, the right hand side of the frame of the closed hood.

Figure 7:
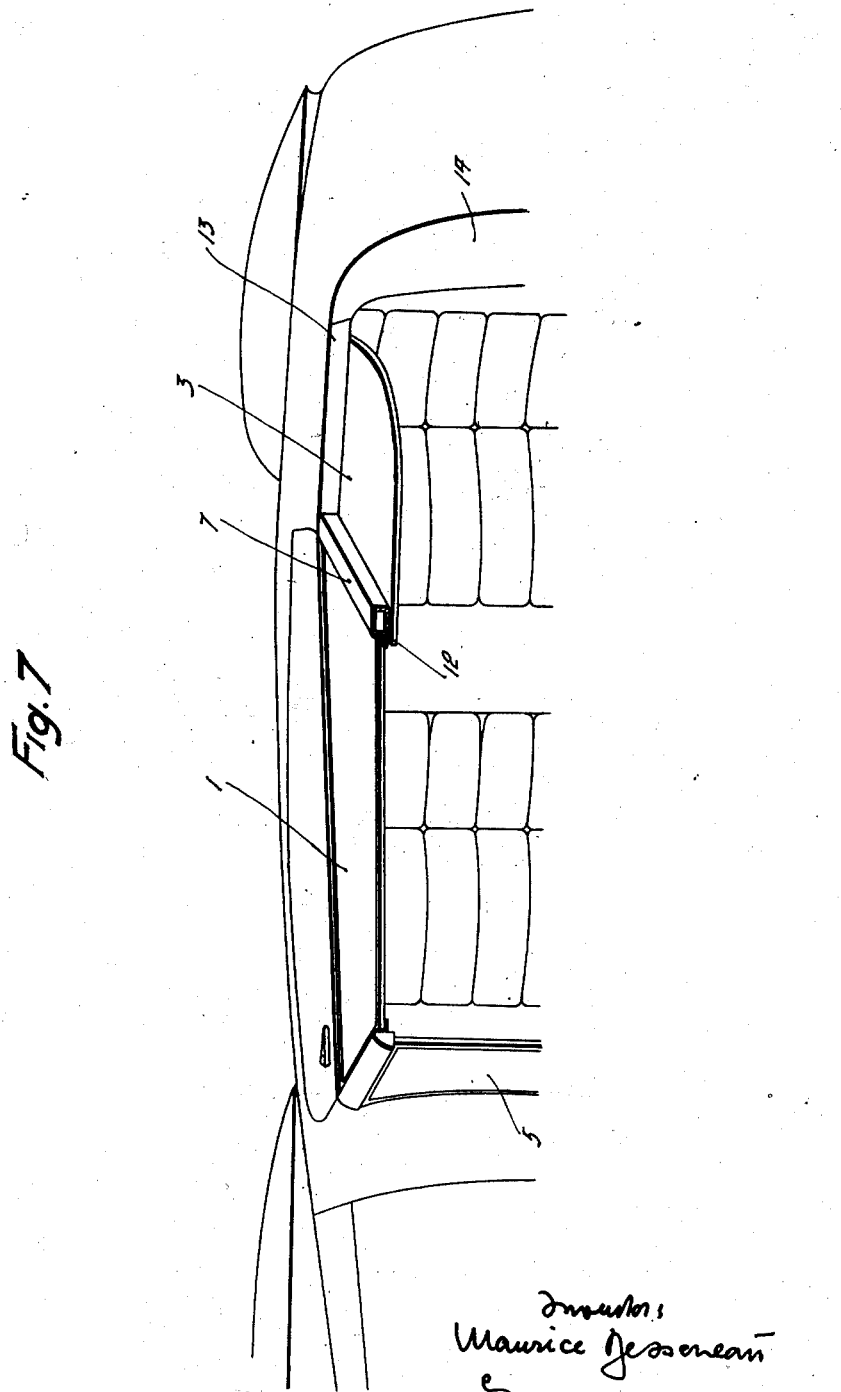

Figs. 5 and 6 are enlarged views of the parts of said frame shown inside the circle designated in Figs. 4 and 3 by the corresponding reference numerals 5 and 6.

Fig. 7 is a part plan view of the cab with the hood folded.

In addition to the usual windows 1 carried by the doors 2, the four-seater illustrated is provided with two further windows 3 that are stationary or movable and are located to the rear of the windows 1 of the stationary part of the body-work, said latter windows 3 being according to my invention slightly shifted towards the inside of the car as apparent from Fig. 7; these windows extend compartively far to the rear and protect efficiently, when the automobile has its hood down (Fig. 2), the passengers sitting in the rear seats against the wind; a slight overlap, that is advantageous without being essential, exists in the example illustrated between the rear edge of each front window 1 and the front end of the rear window 3 corresponding therewith. When the automobile has its hood on as shown in Fig. 1, the rear windows 3 are entirely concealed by the hood 4 fitting over the front window pane 1 and over the windshields 5 in the usual manner, whereby the appearance of the automobile is wholly identical with that of the usual four-seat, two-window cab.

In this form of execution, the hood 4 is carried by a pivoting frame of the type used heretofore only on automobiles with a folding hood and four visible windows and described in my said prior Patent No. 2,185,581. I will only mention, of such an arrangement, the elements that have been modified so as to be applicable to the present case. A chief element of the known arrangement is constituted to either side of the automobile by a central rest or upright 7 pivotally secured to a stationary point 8 located a little behind the rear edge 9 of the gate 2 while the two cooperating uprights are connected through a transversal arch 10 to which the hood canvas is secured. The two uprights are provided with a longitudinal groove serving as slideways for the members controlling the pivoted frame of the hood located to the front of said arch 10.

In the particular application to the present invention of such an arrangement, each upright 7 lies, when the hood is on, in the plane of the front window 1, immediately in contact with the rear edge of the latter, that is on the outside with reference to the rear window 3 and it carries a fluid-tight rubber packing 12 that is urged by said upright against said rear edge of the front glass pane 1. In addition the canvas of the hood is secured to said uprights down to the belt of the automobile bodywork. When the hood is folded, the upright 7 recedes inside the usual housing provided for the hood as illustrated in dotted lines in Fig. 3, which housing is closed at its upper part through doors or shutters 13 or 14 (Fig. 7).

Obviously my invention is by no means limited to the forms of execution disclosed or illustrated which have been given out solely by way of exemplification.

What I claim is:

1. In an automobile of the convertible type having a body, a foldable top and two opposite side doors, a window arrangement on each side of the automobile comprising, in combination, a front side window mounted on a respective side door and having a rear edge; a rear side window mounted on the body of the automobile rearwardly and inwardly of and in spaced relation to said front side window and having a front edge located in the region of the rear edge of said front side window and inwardly thereof so as to form a gap between said front side window and said rear side window; and an upright pivotally mounted at its bottom end on the body of the automobile in the region of the rear edge of said front side window and being connected at its top end to said foldable top so as to turn together with the same during movement of the foldable top between open and covering position, said upright being located so as to engage the outer surface of said rear side window and so as to abut against the rear edge of said front side window when said foldable top is in covering position, whereby said upright serves in such covering position of the foldable top simultaneously as a closure means for said gap between said front edge of the rear side window and said rear edge of the front side window and as a vibration preventing means firmly holding both windows and preventing contact therebetween during movement of the automobile.

2. In an automobile of the convertible type having a body, a foldable top and two opposite side doors, a window arrangement on each side of the automobile comprising, in combination, a front side window mounted on a respective side door and having a rear edge portion terminating in a rear edge of said front side window; a rear side window mounted on the body of the automobile and having a front edge portion, said rear side window being located inwardly of and in staggered and spaced relation to said front side window so that said front edge portion of said rear side window overlaps the rear edge portion of said front side window, whereby a vertical narrow gap is provided between said rear edge portion of said front side window and said front edge portion of said rear side window; an upright pivotally mounted at its bottom end on the body of said automobile in the region of the rear edge of said front side window and being connected at its top end to said foldable top so as to turn together therewith during movement of the foldable top between open and covering positions, said upright being located so as to engage the outer surface of said rear side window and so as to abut against the rear edge of said front side window when said foldable top is in covering position, whereby said upright serves in such covering position of the foldable top simultaneously as a closure means for said narrow vertical gap between the front edge portion of said rear side window and the rear edge portion of said front side window and as a vibration preventing means firmly holding both windows and preventing contact therebetween during movement of the automobile; and an elongated strip of resilient material which is of lesser thickness than the thickness of said narrow vertical gap connected to said upright and located in said narrow vertical gap between said rear edge portion of said front side window and said front edge portion of said rear side window, when the foldable top is in covering position, whereby, if said windows should move towards each other, said strip of resilient material effectively prevents contact therebetween.

MAURICE BESSONNEAU.

REFERENCES CITED

The following references are of record in the file of this patent:

UNITED STATES PATENTS

| Number | Name | Date |
|---|---|---|
| 2,015,547 | Carr | Sept. 24, 1935 |
| 2,185,581 | Bessonneau | Jan. 2, 1940 |
| 2,278,646 | Clark | Apr. 7, 1942 |
| 2,297,820 | Westrope | Oct. 6, 1942 |

FOREIGN PATENTS

| Number | Country | Date |
|---|---|---|
| 319,969 | Great Britain | Oct. 3, 1929 |